R. HERBST & A. BARTOSCH.
KNEADING AND MIXING MACHINE.
APPLICATION FILED JULY 30, 1914.
1,201,298.
Patented Oct. 17, 1916.
2 SHEETS—SHEET 2.
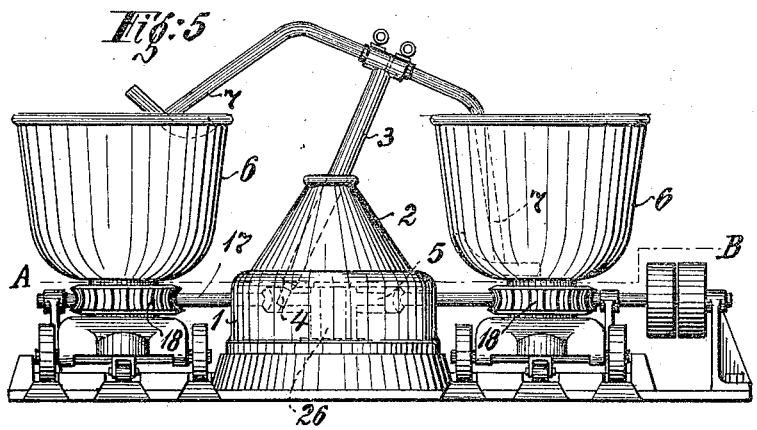
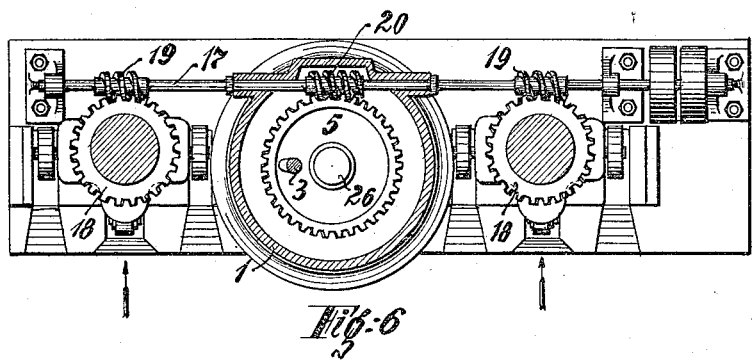
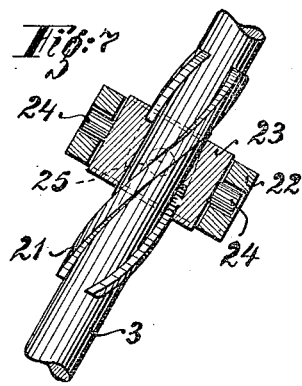
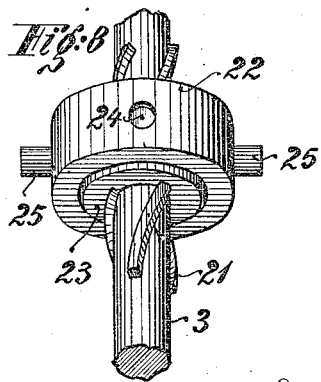

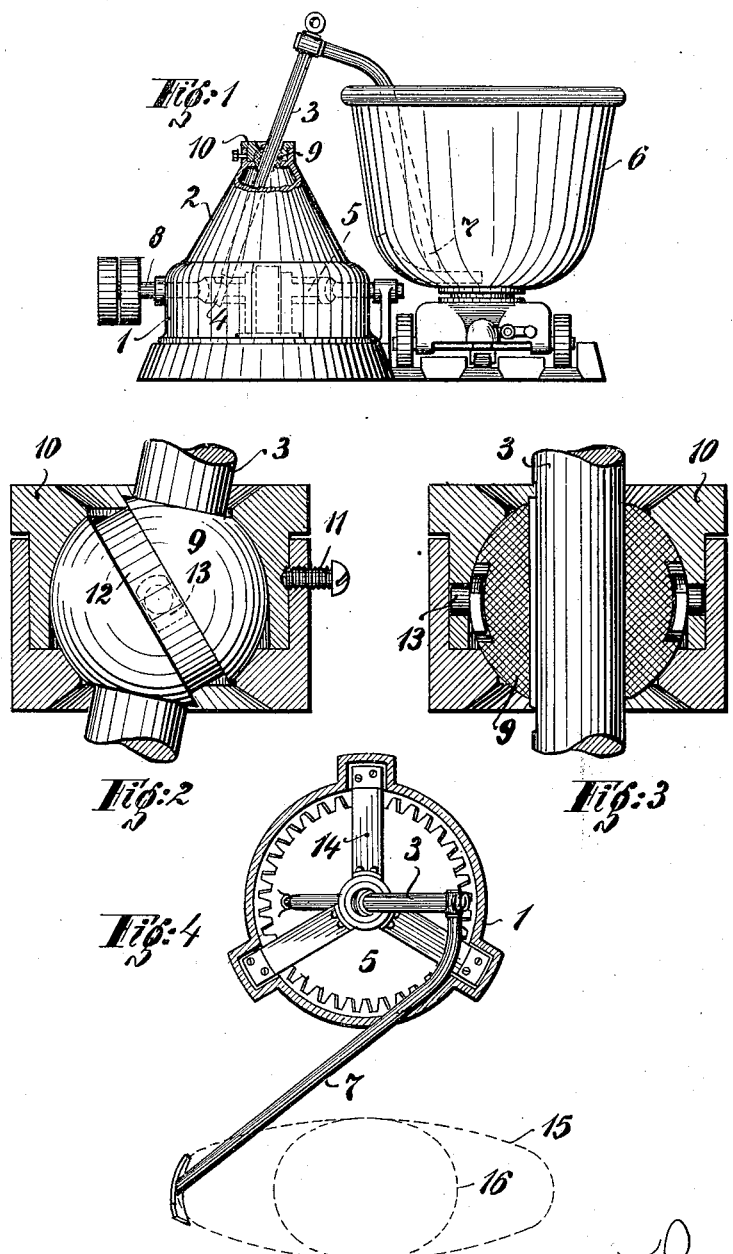

UNITED STATES PATENT OFFICE.

RICHARD HERBST AND ALEXANDER BARTOSCH, OF HALLE-ON-THE-SAALE, GERMANY.

KNEADING AND MIXING MACHINE.

1,201,298.   Specification of Letters Patent.   Patented Oct. 17, 1916.

Application filed July 30, 1914. Serial No. 854,144.

*To all whom it may concern:*

Be it known that we, RICHARD HERBST, engineer, and ALEXANDER BARTOSCH, workmaster, citizens of the German Empire, and residents of Halle-on-the-Saale, Germany, have invented certain new and useful Improvements in Kneading and Mixing Machines; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention relates to a kneading and mixing machine for doughlike substances, in which the kneading lever is caused to describe conical movements, the driven end of said lever being moved by a crank or crank disk.

The essential feature of the invention consists in arranging the plan of the crank or crank disk horizontally in the lower part of the machine frame, while the pivoted joint of said kneading lever is above said crank or crank shaft, the machine frame being preferably of a more or less conical shape. Further the operative end of the kneading arm must be bent at an acute angle into the kneading trough. This construction has the advantage that the frame occupies but very little space, which facilitates the work of the baker, and, if the frame is closed, the entire driving mechanism for the kneading lever can be covered by the same. Of essential importance is further the manner of supporting the kneading lever by means of a ball with a circumferential groove or by another construction of universal joint, in which the kneading lever is adapted to be moved longitudinally by a screw thread. The invention affords further the possibility, if a freely rotating kneading trough is not used, of driving the trough by means of worm gearing from the same shaft by which the kneading lever is driven. Further to the same kneading rod two kneading arms can be attached which work alternately in two opposite troughs.

In the drawing Figure 1 is a side elevation of one construction of the new machine, partly in section. Figs. 2 and 3 show the special construction of a ball joint for carrying the kneading lever. Fig. 4 shows a plan of the kneading lever and of the mechanism for driving same. Fig. 5 is a side elevation and Fig. 6 a cross-sectional view on line A—B in Fig. 5 of a kneading machine with two troughs. Figs. 7 and 8 show a section and plan respectively of a special universal joint for carrying the kneading lever.

1 is the frame of the machine (Fig. 1), in which the horizontal spur-wheel 5 is provided. In a hole of this spur-wheel engages the lever 3 by means of the pin 4. The frame 2 of the machine has a conical shape and is topped by a sleeve 10 which keeps the ball 9 in position. Through this ball passes the kneading arm 3 the end 7 of which is bent down at an acute angle into the trough.

8 is the driving shaft carrying a worm, which engages in the spur-wheel 5. By this means the lever 3 is caused to move in a conical path so that its operative end 7 can carry out the kneading process.

It is of importance to provide as large a stroke as possible for the operative end of the kneading lever. This is obtained in the following manner: The lever 3 is fastened to the ball 9, for example by a wedge. In the ball 9 there is a circumferential groove 12 at right angles to the axis of the lever 3. In this groove engage pins 13 attached to the frame 2. By this circumferential groove and the pins engaging therein the kneading lever 3 is guided in such a manner that a large kneading curve 15 is obtained (Fig. 4).

16 is the normal kneading curve, which is converted into the much larger curve 15 by the device described.

Fig. 4 shows that the frame 2 need not be closed, but may be formed of separate standards 14.

The arrangements shown in Figs. 2 and 3 can be so altered that the circumferential groove is provided in the frame or in the sleeve 10, while the projections 13 would then be provided on the ball 9. The limit for the curve 16 (Fig. 4) is obtained when the circumferential groove 12 is parallel to the axis of the lever 3. In Fig. 1 the trough 6 is not specially driven but rotates owing to the movement of the kneading arm 7 which meets with resistance in the dough, the movement being controlled by intermittently operating brakes.

Instead of the crank disk 5 any other crank device can be provided.

In Fig. 5 the kneading lever 3 carries two kneading arms 7, which engage alternately in the two troughs 6 provided on opposite sides. In this figure mechanism for specially driving the troughs is shown, the shaft 17 being provided with worms 19, 20, 19, which engage in corresponding worm-wheels 18, 5, 18. By this means the kneading device and troughs are connected together in the simplest manner.

The kneading troughs, as shown in Fig. 6, are moved in the direction of the arrows toward the shaft 17.

Figs. 7 and 8 represent another form of universal joint which can be used instead of the ball 9. The pins 25 of the ring 22 are journaled in the frame 2 or sleeve 10, while the middle ring 23 is journaled in the outer ring 22 by means of the pins 24. On the kneading lever 3 there are screw threads 21 which are provided for the following purpose: It is not necessary (Fig. 5) for the middle axis of the vertical trunnion 26 carrying the crank disk to pass through the joint of the kneading lever 3, but they can be displaced in regard to each other. In this case the pin 4 of the kneading lever is constructed as a ball, or it is provided with a ball bearing, so as to permit of lateral movements. In this construction the lever 3, while the crank disk 5 is rotating, can move longitudinally. The screw-threads 21 guide the same and by choosing a suitable form for these screw-threads the lever may be caused to move in any desired path as in the case of Fig. 4.

By suitably choosing the position of the circumferential groove shown in Figs. 2 and 3, or by the choice of the screw thread in the construction shown in Figs. 7 and 8, it is possible to adapt the curve described by the operative end of the lever to the shape of the trough.

Both the bearing of the end 4 of the kneading arm and the bearing of the universal joint can be carried out in the most various manners. It is essential that the crank disk 5, or other crank device, at the lower part of the frame, be horizontal and that the universal joint be above the same in the frame, so that the frame, which is preferably of a conical shape, can inclose the entire mechanism.

What we claim and desire to secure by Letters Patent of the United States is:—

1. A kneading and mixing machine, comprising in combination, a horizontal crank device, a kneading lever engaging at its lower end with said crank device, a means carrying said kneading lever and arranged above said crank device, screw threads on said kneading lever engaging in said lever carrying means, and a kneading trough into which the operative end of the kneading lever is bent at an acute angle, substantially as, and for the purpose set forth.

2. A kneading and mixing machine, comprising in combination, a horizontal crank device, a kneading lever engaging at its lower end with said crank device, a ball on said lever above said crank device and having a circumferential groove therein, pins projecting into said groove, and a kneading trough into which the operative end of the kneading lever is bent at an acute angle, substantially as, and for the purpose specified.

In testimony whereof we affix our signatures in presence of two witnesses.

RICHARD HERBST.
ALEXANDER BARTOSCH.

Witnesses:
WM. P. KENT,
RUDOLPH FRICKE.